(12) United States Patent
Reisch et al.

(10) Patent No.: US 11,300,202 B2
(45) Date of Patent: Apr. 12, 2022

(54) DEVICE FOR MOVING A SHIFTING ELEMENT, AND TRANSMISSION

(71) Applicant: ZF Friedrichshafen AG, Friedrichshafen (DE)

(72) Inventors: Matthias Reisch, Ravensburg (DE); Ralf Dreibholz, Meckenbeuren (DE); Jürgen Wafzig, Bermatingen (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 404 days.

(21) Appl. No.: 16/479,708

(22) PCT Filed: Dec. 18, 2017

(86) PCT No.: PCT/EP2017/083210
§ 371 (c)(1),
(2) Date: Jul. 22, 2019

(87) PCT Pub. No.: WO2018/134009
PCT Pub. Date: Jul. 26, 2018

(65) Prior Publication Data
US 2021/0356039 A1    Nov. 18, 2021

(30) Foreign Application Priority Data
Jan. 23, 2017 (DE) .................. 10 2017 201 017.7

(51) Int. Cl.
*F16H 61/32* (2006.01)
*F16H 63/30* (2006.01)
*F16H 61/28* (2006.01)

(52) U.S. Cl.
CPC .......... *F16H 61/32* (2013.01); *F16H 63/304* (2013.01); *F16H 2061/2884* (2013.01); *F16H 2063/3063* (2013.01); *F16H 2063/3089* (2013.01)

(58) Field of Classification Search
CPC .................. F16H 61/32; F16H 63/304; F16H 2061/2884; F16H 2063/3063; F16H 2063/3089
(Continued)

(56) References Cited

U.S. PATENT DOCUMENTS 4,793,458 A    12/1988  Shealy
5,251,503 A *  10/1993  Morris ................... F16H 61/32
                                                        74/335

(Continued)

FOREIGN PATENT DOCUMENTS

DE    2540936 A1    3/1977
DE    19713423 A1   11/1997
(Continued)

OTHER PUBLICATIONS

German Search Report DE102017201017.7, dated Oct. 19, 2017. (14 pages).
(Continued)

*Primary Examiner* — Ha Dinh Ho
(74) *Attorney, Agent, or Firm* — Dority & Manning, P.A.

(57) ABSTRACT

A device (5) for selective displacement of a shift element (4) towards a first shift position and/or a second shift position includes an actuator (6) and a spring module (7). The spring module (7) includes an actuator-side force-introduction element, a shift element-side force-introduction element, and a spring arrangement. The spring arrangement includes a first spring end and a second spring end. The actuator-side force-introduction element and the shift element-side force-introduction element each include a first support section and a second support section for supporting the spring ends. The first spring end is associated with the first support section of the shift element-side force-introduction element and with the second support section of the actuator-side force-intro- (Continued)

duction element. The second spring end is associated with the first support section of the actuator-side force-introduction element and with the second support section of the shift element-side force-introduction element.

10 Claims, 5 Drawing Sheets

(58) Field of Classification Search
USPC .......................................................... 74/335
See application file for complete search history.

(56) References Cited

U.S. PATENT DOCUMENTS

| | | | | |
|---|---|---|---|---|
| 5,452,779 | A * | 9/1995 | Gee | ................ B60T 11/20 |
| | | | | 192/12 C |
| 6,220,109 | B1 | 4/2001 | Fischer et al. | |
| RE46,242 | E | 12/2016 | Mohr et al. | |
| 2007/0144285 | A1 * | 6/2007 | Mochizuki | ............. F16H 61/32 |
| | | | | 74/329 |
| 2016/0101690 | A1 * | 4/2016 | Imafuku | ............. B60K 17/344 |
| | | | | 701/51 |
| 2016/0341310 | A1 | 11/2016 | Zhao | |
| 2017/0036538 | A1 * | 2/2017 | Imafuku | ............... F16H 57/043 |

FOREIGN PATENT DOCUMENTS

| | | |
|---|---|---|
| DE | 10359092 A1 | 7/2005 |
| DE | 102006049274 A1 | 4/2008 |
| DE | 102008000635 A1 | 9/2009 |
| DE | 10081962 B4 | 6/2011 |
| WO | WO 2009/112345 | 9/2009 |

OTHER PUBLICATIONS

International Search Report (English Translation) PCT/EP2017/083210, dated Mar. 7, 2018. (3 pages).

* cited by examiner

Fig. 8

DEVICE FOR MOVING A SHIFTING ELEMENT, AND TRANSMISSION

FIELD OF THE INVENTION

The invention relates generally to a device for the selective displacement of a shift element in the direction of a first shift position and/or in the direction of a second shift position. The device includes an actuator and a spring module which is active between the actuator and the shift element. In addition, the invention relates generally to a transmission, in particular for a motor vehicle.

BACKGROUND

DE 25 40 936 A1 describes a remotely controllable transmission, in particular a powershift transmission for auxiliary deck machinery, including pinions which are movable back and forth between the shift positions with the aid of a shift cable, and the shifting force generator of which is connected to an electrical control system which enables the triggering of the gear shift remotely from the installation site of the transmission, in the case of which one or more spring elements, which can be tensioned in the direction of the shift cable, is/are connected within the shift cable between a fixed point and the shifting pinion to be moved.

DE 10 2006 049 274 A1 describes a device for actuating a component which is rotatably mounted on a shaft, preferably a gearwheel of a transmission device, which is designed as an idler gear, which component is transferrable, with the aid of at least one engagement device including an electric actuator, into an engaged condition, in which the component is rotationally fixed to the shaft, wherein the component can be acted upon, from the interior of the shaft, with the actuation force necessary for engagement or disengagement, in the case of which the at least one electric actuator is at least partially arranged in the interior of the shaft.

SUMMARY OF THE INVENTION

Example aspects of the invention constructurally and/or functionally improve a device mentioned at the outset. In addition, example aspects of the invention constructurally and/or functionally improve a transmission.

The shift element can be arranged on a shaft. The shift element can be connected to the shaft in a rotationally fixed manner. The shaft can have a shaft axis. Unless indicated otherwise or unless something different arises from the context, "axial" refers to the shaft axis in the present case. An "axial" direction then corresponds to an extension direction of the shaft axis.

The shift element can be axially displaceable. The shift element can be utilized for the engageable connection to at least one component rotatably mounted on the shaft. The shift element can be utilized for the engageable connection to a first component rotatably mounted on the shaft and/or to a second component rotatably mounted on the shaft. The at least one component rotatably mounted on the shaft can be a gearwheel. The at least one component rotatably mounted on the shaft can be an idler gear. The shift element can be a synchronizer sleeve. The shift element and the at least one component rotatably mounted on the shaft can include corresponding tooth systems. The shift element and the at least one component rotatably mounted on the shaft can include axially displaceable tooth systems. The shift element and the at least one component rotatably mounted on the shaft can include axially engageable/disengageable tooth systems.

The direction to the first shift position and the direction to the second shift position can be axially opposite one another. The actuator can include an electric motor. The electric motor can include a stator and a rotor. The actuator can include an actuator housing. The stator can be arranged in an actuator housing-affixed manner. The rotor can be rotatable relative to the stator. The electric motor can be a brushless DC motor (abbreviated as BLDC motor or BL motor, or an electronically commutated motor, i.e., EC motor).

The actuator and the shift element can be kinematically connected to one another. The spring module can be arranged in a kinematic chain between the actuator and the shift element. The device can include a connecting element for the mutual connection of the shift element-side force-introduction element and the shift element.

The actuator-side force-introduction element can be mechanically acted upon with the aid of the actuator. The shift element-side force-introduction element can be utilized for mechanically acting upon the shift element. The actuator-side force-introduction element and the shift element-side force-introduction element can be axially displaceable with respect to one another. The shift element-side force-introduction element can be guided centered on the actuator-side force-introduction element. The actuator-side force-introduction element and the shift element-side force-introduction element can each enclose the spring module in a clamp-like manner. The actuator-side force-introduction element and the shift element-side force-introduction element can form a spring housing for the spring arrangement.

In the case of a force application starting from the actuator in the direction of the first shift position, the second spring end can rest against the first support section of the actuator-side force-introduction element, and the first spring end can rest against the first support section of the shift element-side force-introduction element. In the case of a force application starting from the actuator in the direction of the first shift position, the second support section of the actuator-side force-introduction element and the second support section of the shift element-side force-introduction element can lift off of the spring ends. In the case of a force application starting from the actuator in the direction of the second shift position, the first spring end can rest against the second support section of the actuator-side force-introduction element, and the second spring end can rest against the second support section of the shift element-side force-introduction element. In the case of a force application starting from the actuator in the direction of the second shift position, the first support section of the actuator-side force-introduction element and the first support section of the shift element-side force-introduction element can lift off of the spring ends.

A force application starting from the actuator in the direction of the first shift position or the second shift position can initially take place counter to a spring force of the spring arrangement, wherein the spring arrangement stores mechanical energy. Subsequently, the mechanical energy stored in the spring arrangement can be utilized for acting upon the shift element-side force-introduction element.

The spring arrangement can have, in a first quadrant of a force-displacement diagram, a characteristic curve including a first characteristic curve section having a lesser slope and a second characteristic curve section having a greater slope. The first characteristic curve section can extend having an at least approximately constant force. The second characteristic curve section can extend having an at least approximately linearly increasing force.

The spring arrangement can have a point-symmetrical characteristic curve in a first quadrant and in a third quadrant of a force-displacement diagram. The spring arrangement can have, in the first quadrant and in the third quadrant of the force-displacement diagram, starting from an origin, a characteristic curve including, in each case, a first characteristic curve section having a lesser slope and, in each case, a second characteristic curve section having a greater slope. The first characteristic curve sections can each extend having an at least approximately constant force. The second characteristic curve sections can each extend having an at least approximately linearly increasing force. The spring arrangement can be preloaded.

The spring arrangement can include multiple springs. The spring arrangement can include at least one first spring having a first stiffness constant and at least one second spring having a second stiffness constant. The spring arrangement can include plate springs. The spring arrangement can include cylindrical springs, if necessary multi-stage, conical springs, volute springs, or elastomer springs.

The actuator, the actuator-side force-introduction element, the spring module, and/or the shift element-side force-introduction element can be arranged within a shaft. The actuator, the actuator-side force-introduction element, the spring module, and/or the shift element-side force-introduction element can be arranged radially within a shaft.

A threaded spindle including a spindle rod and a spindle nut can be active between the actuator and the actuator-side force-introduction element. The threaded spindle can be self-locking. The spindle rod can be associated with the actuator. The spindle rod can be associated with the actuator-side force-introduction element. The spring arrangement can be arranged radially on the outside on the actuator-side force-introduction element or the spindle nut. The spring arrangement can be centered on the actuator-side force-introduction element and/or the spindle nut.

The actuator-side force-introduction element and the shift element-side force-introduction element can be guided in such a way that they are rotationally fixed and displaceable with respect to one another. The shift element-side force-introduction element can be guided in such a way that it is rotationally fixed and displaceable with respect to an actuator-affixed component. The actuator-side force-introduction element can be guided in such a way that it is rotationally fixed and displaceable with respect to the actuator-affixed component. "Actuator-affixed" means, in this case, in particular, affixed to the actuator housing and/or affixed to the stator. A rotationally fixed and displaceable guidance can also be referred to as torsional fixing.

The shift element can be selectively displaceable starting from a central position, in which a connection between a shaft and components rotatably mounted on the shaft is disengaged, into a first shift position, in which the connection between the shaft and a first component rotatably mounted on the shaft is engaged, or into a second shift position, in which the connection between the shaft and a second component rotatably mounted on the shaft is engaged. The first shift position and the second shift position can be end positions. The spring module can be active during a displacement in the direction of the first shift position as well as during a displacement in the direction of the second shift position. The shift element can also be referred to as a double shift element.

The transmission can be a manual transmission. The transmission can be a multi-ratio transmission. The transmission can be a dual clutch transmission. The transmission can be actuatable in an automated manner. The transmission can include at least one shaft. The at least one shaft can be hollow, at least partially or in sections. The transmission can include at least one component rotatably mounted on the at least one shaft. The transmission can include a first component rotatably mounted on the at least one shaft and a second component rotatably mounted on the at least one shaft. The at least one component rotatably mounted on the at least one shaft can be a gearwheel. The at least one component rotatably mounted on the at least one shaft can be an idler gear. The transmission can include a transmission housing.

The device can be arranged on the at least one shaft. The shift element can be arranged on the at least one shaft. The shift element can be arranged axially between the first component rotatably mounted on the at least one shaft and the second component rotatably mounted on the at least one shaft. The actuator housing can be fixedly connected to the transmission housing.

The term "can" refers, in particular, to optional features of the invention. Accordingly, there is an exemplary embodiment of the invention in each case, which includes the particular feature or the particular features.

The invention results in an increase in shifting comfort. A shift time is reduced. An implementation of a gear change operation is ensured. Wear, noise, and/or jerk are/is reduced. Setting a suitable rotational-speed window during the engagement of a shift connection is facilitated. An installation space requirement is reduced. Outlay, such as design complexity, manufacturing effort, and/or costs, is reduced.

BRIEF DESCRIPTION OF THE DRAWINGS

Exemplary embodiments of the invention are described in greater detail in the following with reference to figures. Further features and advantages arise from this description. Specific features of these exemplary embodiments can represent general features of the invention. Features of these exemplary embodiments associated with other features can also represent individual features of the invention.

In the drawing, diagrammatically and by way of example.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
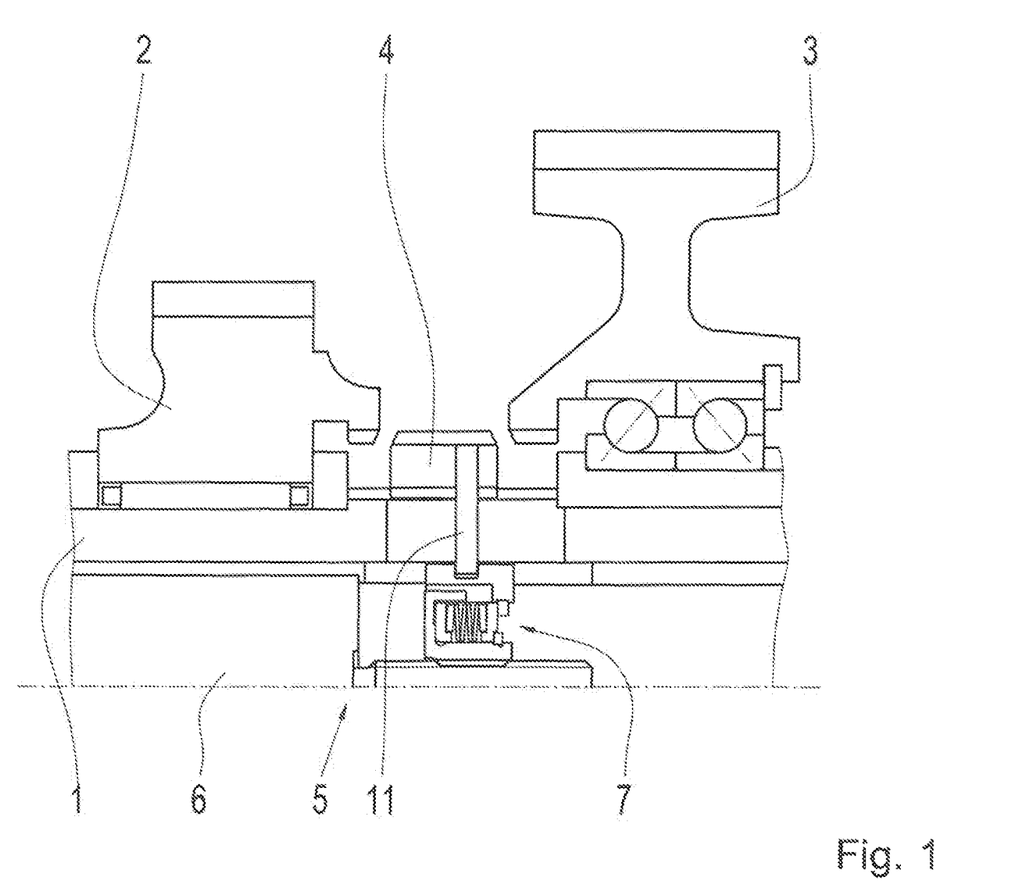
FIG. 1 shows a shaft including two idler gears, a displaceable shift element, and a device including an actuator and a spring module for displacing the shift element, in a central position.
Figure 2:
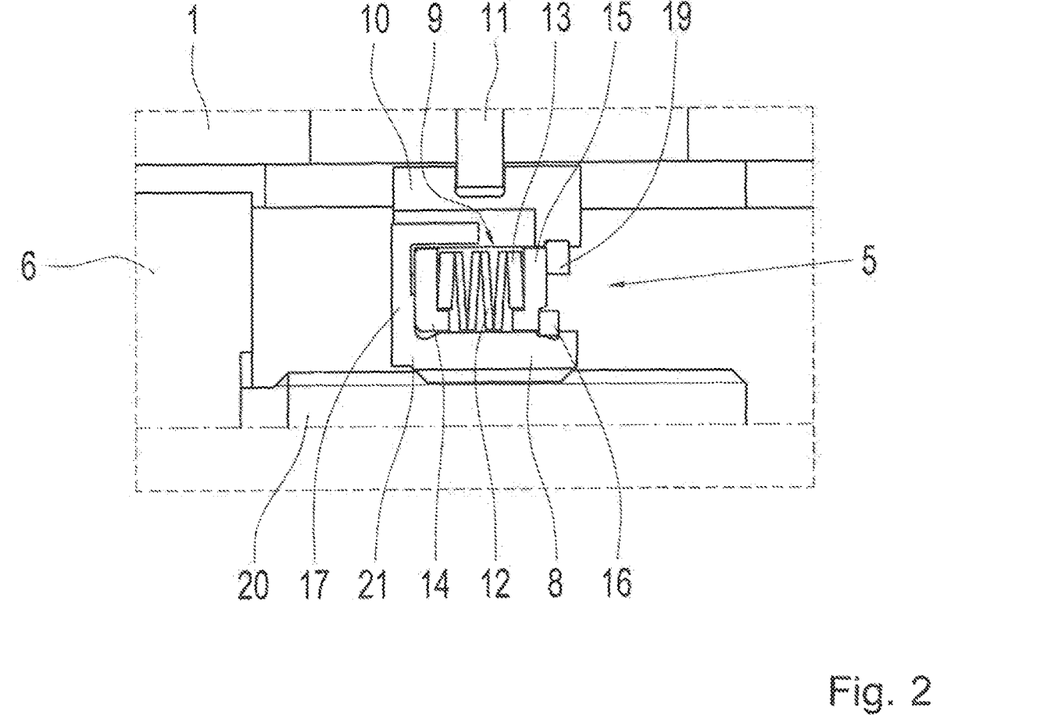
FIG. 2 shows a cutaway view of a device including an actuator and a spring module for displacing a shift element.
Figure 3:
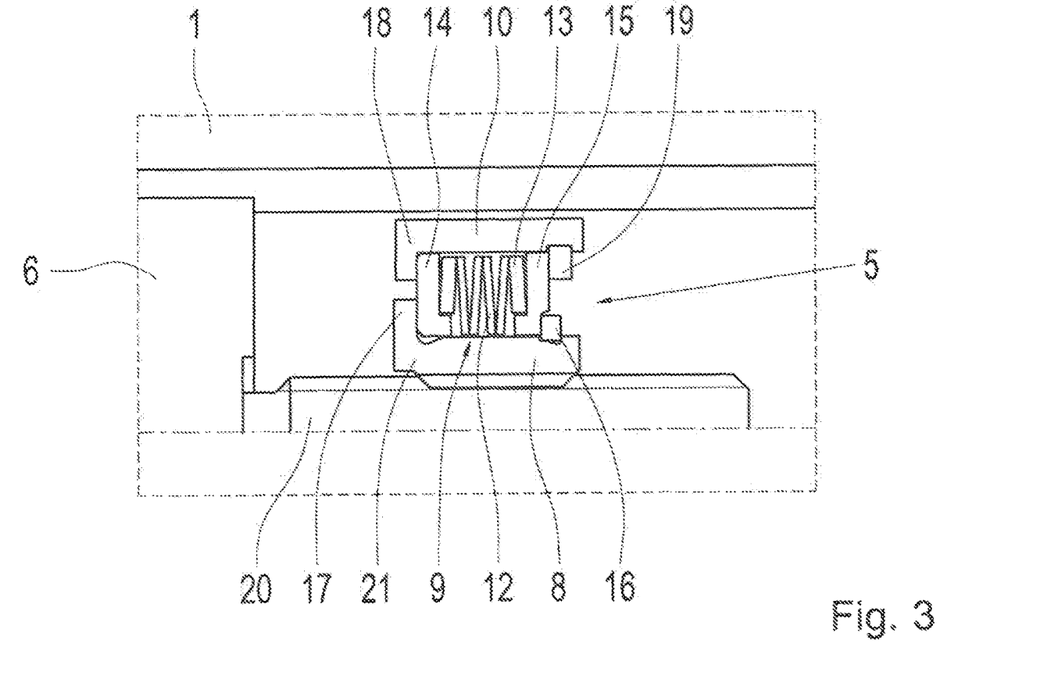
FIG. 3 shows a cutaway view of a device including an actuator and a spring module for displacing a shift element.
Figure 4:
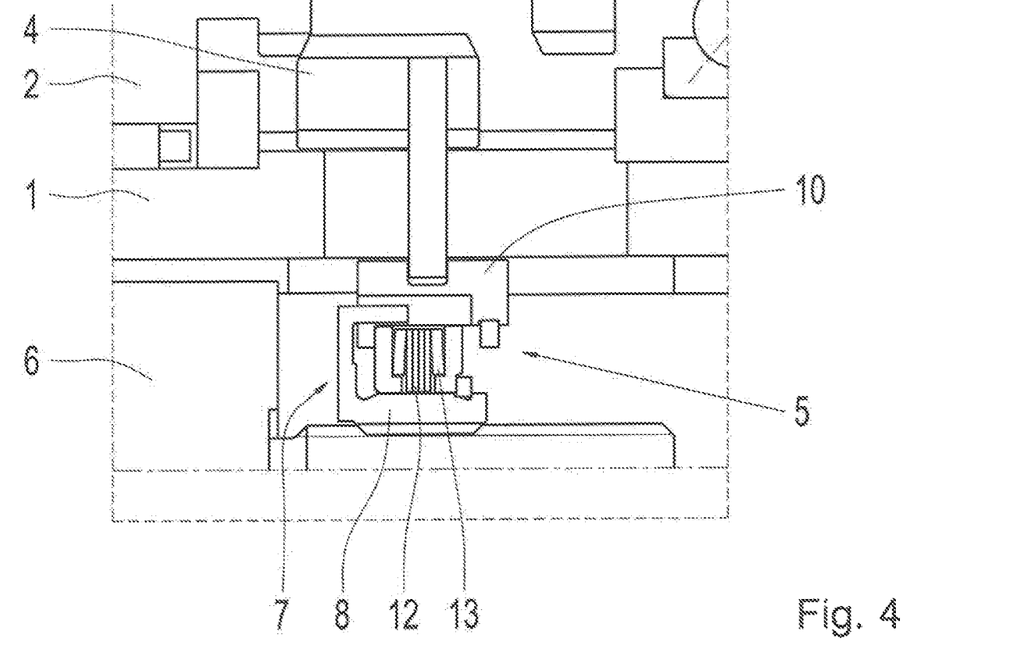
FIG. 4 shows a device including an actuator and a spring module for displacing a shift element when acted upon in the direction of a first shift position.
Figure 5:
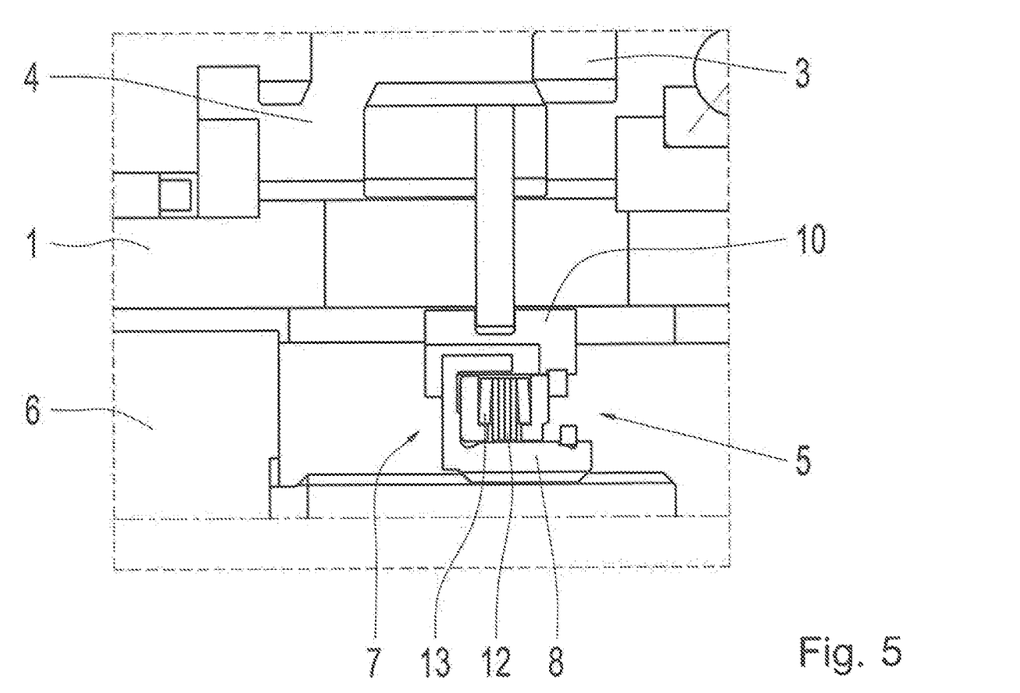
FIG. 5 shows a device including an actuator and a spring module for displacing a shift element when acted upon in the direction of a second shift position.

FIG. 1 shows a shaft 1 including a first idler gear 2, a second idler gear 3, a displaceable shift element 4, and a device 5 including an actuator 6 and a spring module 7 for displacing the shift element 4, in a central position. FIG. 2 and FIG. 3 show the device 5 in different cutaway views. FIG. 4 shows the device 5 when acted upon in the direction of a first shift position. FIG. 5 shows the device 5 when acted upon in the direction of a second shift position.

The shaft 1 is a transmission shaft. The idler gears 2, 3 are rotatably mounted on the shaft 1. The shift element 4 is rotationally fixed to the shaft 1 and is axially displaceable. The shift element 4 and the idler gears 2, 3 include corresponding axially engageable/disengageable tooth systems. The shift element 4, starting from the central position shown in FIG. 1, in which a connection between the shaft 1 and the idler gears 2, 3 is disengaged, is selectively displaceable in the direction shown in FIG. 4, in which a connection between the shaft 1 and the first idler gear 2 is engaged, or into the shift position shown in FIG. 5, in which a connection between the shaft 1 and the second idler gear 3 is engaged.

The spring module 7 includes an actuator-side force-introduction element 8, a spring arrangement 9, and a shift element-side force-introduction element 10. The shift element-side force-introduction element 10 and the shift element 4 are connected to one another with the aid of a connecting element 11.

The spring arrangement 9 includes first softer plate springs, such as 12, second harder plate springs, such as 13, a stop washer which forms a first spring end 14, and a stop washer which forms a second spring end 15. With the aid of the stop washers, it is made possible to act upon the plate springs 12, 13, with respect to an extent, independently of position.

The actuator-side force-introduction element 8 includes a first support section 16 active in the direction of the first shift position and a second support section 17 active in the direction of the second shift position. The first support section 16 is designed as a securing ring or an annular ring. The second support section 17 is designed like a collar. The actuator-side force-introduction element 8 encloses the spring arrangement 9 in the manner of a clamp via its support sections 16, 17. The spring arrangement 9 is radially centered on the actuator-side force-introduction element 8.

The shift element-side force-introduction element 10 likewise includes a first support section 18 active in the direction of the first shift position and a second support section 19 active in the direction of the second shift position. The first support section 18 is designed like a collar. The second support section 19 is designed as a securing ring or an annular ring. The shift element-side force-introduction element 10 encloses the spring arrangement 9 in the manner of a clamp via its support sections 18, 19.

The spring arrangement 9 rests, preloaded, via the first spring end 14 of spring arrangement 9, against the first support section 18 of the shift element-side force-introduction element 10 and against the second support section 17 of the actuator-side force-introduction element 8, and via the second spring end 15 of spring arrangement 9 against the first support section 16 of the actuator-side force-introduction element 8 and against the second support section 19 of the shift element-side force-introduction element 10. The actuator-side force-introduction element 8 and the shift element-side force-introduction element 10 form a spring housing for the spring arrangement 9.

The actuator-side force-introduction element 8 and the shift element-side force-introduction element 10 are rotationally fixed and axially displaceable with respect to one another and with respect to the shaft 1. The shift element-side force-introduction element 10 is guided centered on the actuator-side force-introduction element 8.

The shaft 1 is hollow, at least in sections. The actuator 6 and the spring module 7 are arranged radially within the shaft 1. The connecting element 11 extends radially outward across a shaft surface.

The actuator 6 includes an actuator housing. The actuator 6, including its actuator housing, is arranged in a shaft-affixed manner. The actuator 6 includes an electric motor including an actuator housing-affixed stator and a rotor which is rotatable relative to the stator. The electric motor is, for example, a brushless DC motor.

A self-locking threaded spindle including a spindle rod 20 and a spindle nut 21 is active between the actuator 6 and the actuator-side force-introduction element 8. The spindle rod 20 is rotatable with the aid of the electric motor. The spindle nut 21 is formed on the shift element-side force-introduction element 10 in this case.

In order to engage a connection between the first idler gear 2 and the shift element 4, starting from the central position, the actuator-side force-introduction element 8 is acted upon with the aid of the actuator 6 in the direction of the first shift position. When the tooth systems of the shift element 4 and of the first idler gear 2 impact one another tooth-on-tooth, as shown in FIG. 4, the actuator-side force-introduction element 8 and the shift element-side force-introduction element 10 are displaced toward one another, counter to a spring force of the plate springs 12, 13, and the plate springs 12, 13 are further tensioned. As soon as teeth and gaps of the tooth systems of the shift element 4 and of the first idler gear 2 impact one another, in a manner related to the differential rotational speed, the tooth systems mesh, thereby unloading the plate springs 12, 13.

In order to engage a connection between the second idler gear 3 and the shift element 4, starting from the central position, the actuator-side force-introduction element 8 is acted upon with the aid of the actuator 6 in the direction of the second shift position. When the tooth systems of the shift element 4 and of the second idler gear 3 impact one another tooth-on-tooth, as shown in FIG. 5, the actuator-side force-introduction element 8 and the shift element-side force-introduction element 10 are displaced toward one another, counter to a spring force of the plate springs 12, 13, and the plate springs 12, 13 are further tensioned. As soon as teeth and gaps of the tooth systems of the shift element 4 and of the second idler gear 3 impact one another, in a manner related to the differential rotational speed, the tooth systems mesh, thereby unloading the plate springs 12, 13.

Therefore, a synchronizing torque acting between the shift element 4 and an idler gear 2, 3 is limited and a rapid, sufficiently deep plunging of teeth into gaps of the tooth systems between the shift element 4 and an idler gear 2, 3 is assisted. The spring module 7 is utilized during engagement in the direction of the first shift position as well as during engagement in the direction of the second shift position.

Figure 6:
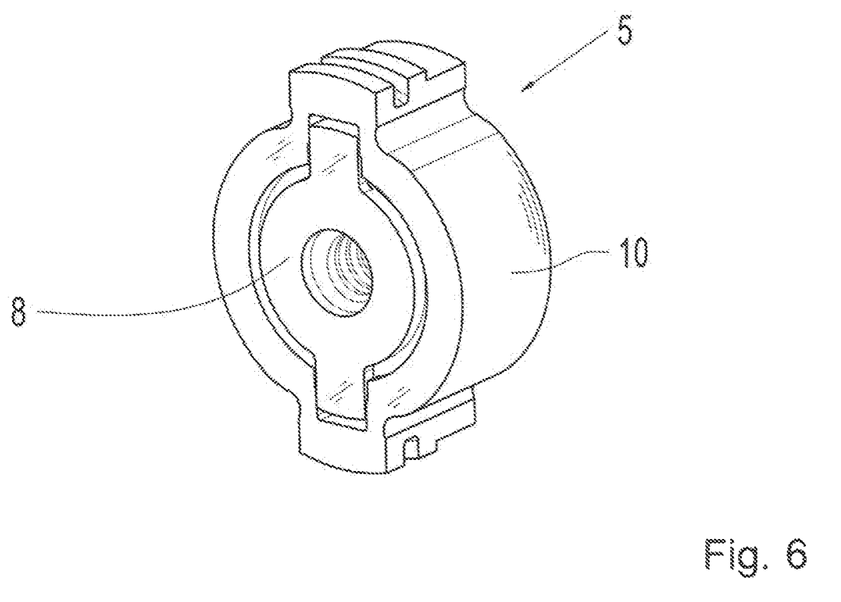
FIG. 6 shows a perspective view of a device including an actuator-side force-introduction element and a shift element-side force-introduction element for displacing a shift element.
Figure 7:
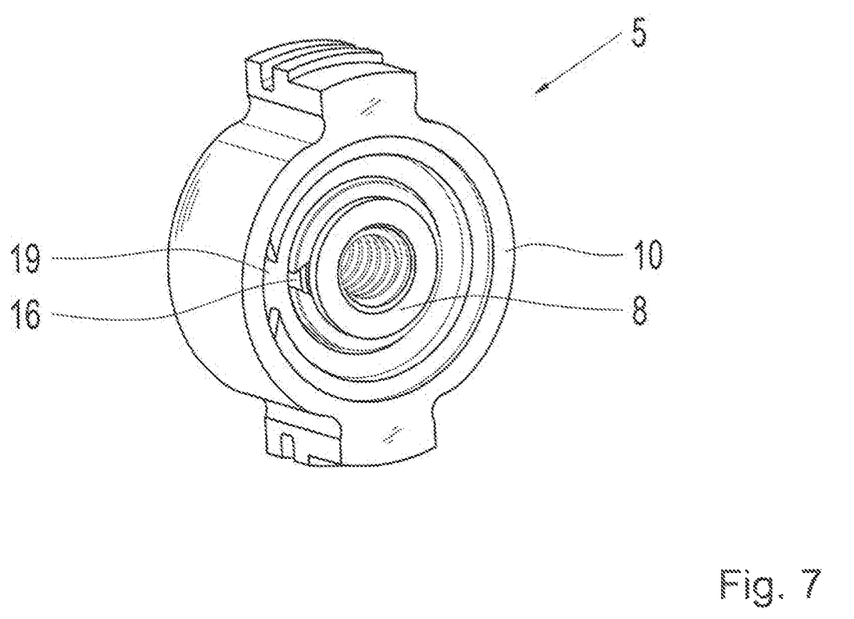
FIG. 7 shows a perspective view of a device including an actuator-side force-introduction element and a shift element-side force-introduction element for displacing a shift element.

FIG. 6 shows the device 5 including the actuator-side force-introduction element 8 and the shift element-side force-introduction element 10 for displacing a shift element, in a perspective view from the front. Clearly shown are a torsional stop between the actuator-side force-introduction element 8 and the shift element-side force-introduction element 10, and a torsional stop for the actuator housing-side support of the shift element-side force-introduction element 10. FIG. 7 shows the device 5 in a perspective view from behind. Clearly shown are the first support section 16 of the actuator-side force-introduction element 8 and the second support section 19 of the shift element-side force-introduction element 10. For the rest, reference is additionally made, in particular, to FIG. 1 to FIG. 5 and the associated description.

Figure 8:
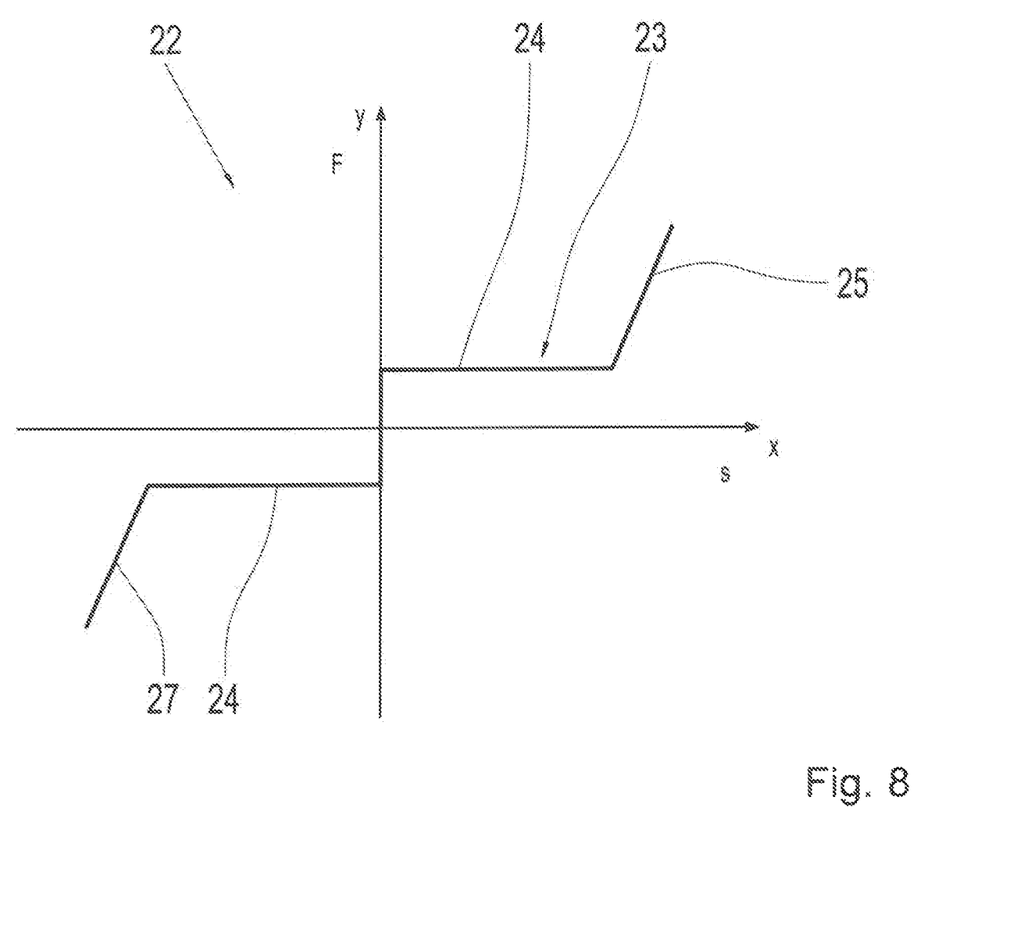
FIG. 8 shows a force-displacement diagram of a spring arrangement of a device for displacing a shift element.

FIG. 8 shows a force-displacement diagram 22 of the spring arrangement 9. In the diagram, a spring travel is plotted on an x-axis and a spring force is plotted on a y-axis. The spring arrangement 9 has a point-symmetrical characteristic curve 23. Starting from an origin, the characteristic curve 23 includes, in a first quadrant of the force-displacement diagram 22, a first characteristic curve section 24 having an at least approximately constant force and, thereafter, a second characteristic curve section 25 having an at least approximately linearly increasing force. Starting from the origin, the characteristic curve 23 includes, in a third quadrant of the force-displacement diagram 22, a first characteristic curve section 26 having an at least approximately constant force and, thereafter, a second characteristic curve section 27 having an at least approximately linearly increasing force. The characteristic curve in the third quadrant of the force-displacement diagram 22 is active during an engagement of the connection between the first idler gear 2 and the shift element 4. The characteristic curve in the first quadrant of the force-displacement diagram 22 is active during an engagement of the connection between the second idler gear 3 and the shift element 4. For the rest, reference is additionally made, in particular, to FIG. 1 to FIG. 7 and the associated description.

Modifications and variations can be made to the embodiments illustrated or described herein without departing from the scope and spirit of the invention as set forth in the appended claims.

REFERENCE CHARACTERS 1 shaft
2 first component, first idler gear
3 second component, second idler gear
4 shift element
5 device
6 actuator
7 spring module
8 actuator-side force-introduction element
9 spring arrangement
10 shift element-side force-introduction element
11 connecting element
12 first plate spring
13 second plate spring
14 first spring end
15 second spring end
16 first support section
17 second support section
18 first support section
19 second support section
20 spindle rod
21 spindle nut
22 force-displacement diagram
23 characteristic curve
24 first characteristic curve section
25 second characteristic curve section
26 first characteristic curve section
27 second characteristic curve section

The invention claimed is:

1. A device (5) for the selective displacement of a shift element (4) towards one or both of a first shift position and a second shift position, the device (5) comprising:
   an actuator (6); and
   a spring module (7) between the actuator (6) and the shift element (4), the spring module (7) comprising an actuator-side force-introduction element (8), a shift element-side force-introduction element (10), and a spring arrangement (9) between the force-introduction elements (8, 10), the spring module (7) including a first spring end (14) and a second spring end (15),
   wherein the actuator-side force-introduction element (8) and the shift element-side force-introduction element (10) each comprise a first support section (16, 18) supporting the first and second spring ends (14, 15) in the first shift position and a second support section (17, 19) supporting the first and second spring ends (14, 15) in the second shift position,
   wherein the first spring end (14) is coupled with the first support section (18) of the shift element-side force-introduction element (10) and the second support section (17) of the actuator-side force-introduction element (8), and the second spring end (15) is coupled with the first support section (16) of the actuator-side force-introduction element (8) and the second support section (19) of the shift element-side force-introduction element (10), and
   wherein the spring arrangement (9) has, in a first quadrant of a force-displacement diagram (22) of the spring arrangement (9), a characteristic curve (23) including a first characteristic curve section (24) having a lesser slope and a second characteristic curve section (25) having a greater slope.

2. The device (5) of claim 1, wherein the spring arrangement (9) has a point-symmetrical characteristic curve (23) in the first quadrant and in a third quadrant of the force-displacement diagram (22).

3. The device (5) of claim 1, wherein the spring arrangement (9) is preloaded.

4. The device (5) of claim 1, wherein the spring arrangement (9) comprises a plurality of plate springs (12, 13).

5. The device (5) of claim 1, wherein one or more of the actuator (6), the actuator-side force-introduction element (8), the spring module (7), and the shift element-side force-introduction element (10) is arranged within a shaft (1).

6. The device (5) of claim 1, wherein a threaded spindle comprising a spindle rod (20) and a spindle nut (21) is positioned between the actuator (6) and the actuator-side force-introduction element (8).

7. The device (5) of claim 1, wherein:
   the actuator-side force-introduction element (8) and the shift element-side force-introduction element (10) are guided such that the force-introduction elements (8, 10) are rotationally fixed and displaceable with respect to each other; and the shift element-side force-introduction element (10) is guided such that the shift element-side force-introduction element (10) is rotationally fixed and displaceable with respect to an actuator-affixed component.

8. The device (5) of claim 1, wherein the actuator-side force-introduction element (8) is guided in such a way that the actuator-side force-introduction element (8) is rotationally fixed and displaceable with respect to an actuator-affixed component.

9. The device (5) of claim 1, wherein:
- the shift element (4), starting from a central position, is selectively displaceable into a first shift position or into a second shift position;
- a connection between a shaft (1) and a first component (2) rotatably mounted on the shaft (1) is engaged in the first shift position;
- a connection between the shaft (1) and a second component (3) rotatably mounted on the shaft (1) is engaged in the second shift position;
- the connections between the shaft (1) and the first and second components (2, 3) are disengaged in the central position; and
- the spring module (7) is loaded during displacement of the shift element (4) in the direction of the first shift position as well as during displacement of the shift element (4) in the direction of the second shift position.

10. A motor vehicle transmission, comprising at least one device (5) of claim 1.

* * * * *